United States Patent [19]

Winn

[11] Patent Number: 4,523,294

[45] Date of Patent: Jun. 11, 1985

[54] CHARACTER SPACED JUSTIFICATION METHOD AND APPARATUS

[75] Inventor: Bryan D. C. Winn, San Antonio, Tex.

[73] Assignee: Southwest Research Institute, San Antonio, Tex.

[21] Appl. No.: 382,630

[22] Filed: May 27, 1982

[51] Int. Cl.[3] ........................ B41J 19/00; G06F 5/00; G06F 9/16

[52] U.S. Cl. ........................................ 364/900; 400/3; 400/7

[58] Field of Search .................. 364/200, 900; 400/12, 400/3-7; 101/93.06

[56] References Cited

U.S. PATENT DOCUMENTS

| | | | |
|---|---|---|---|
| 4,028,680 | 6/1977 | Vittorelli | 364/900 |
| 4,225,249 | 9/1980 | Kettler et al. | 400/3 |
| 4,298,290 | 11/1981 | Barnes et al. | 400/12 |
| 4,348,738 | 9/1982 | Grier et al. | 364/900 |
| 4,398,246 | 8/1983 | Frediani et al. | 364/200 |

FOREIGN PATENT DOCUMENTS

| | | | |
|---|---|---|---|
| 2031626 | 4/1980 | United Kingdom | 400/3 |

*Primary Examiner*—Raulfe B. Zache

*Assistant Examiner*—David L. Clark

*Attorney, Agent, or Firm*—Gunn, Lee & Jackson

[57] ABSTRACT

Method and apparatus for performing true right justification applicable to character printers utilizing variable character spacing. The method of the present invention may be applied to any printer that is capable of variable character pitch settings in response to external control signals. In addition to such a printer, apparatus includes a word processing terminal, and a microcomputer dedicated to the terminal and printer and designed to map the features of the terminal into features available in the printer. In addition to the functions of initialization, data discrimination, control code examination, and vertical carriage positioning, two other functions are provided, one of which does mapping and horizontal carriage positioning, the other of which comprises a service routine used by the other functions to read, write, or store characters and to calculate dimensional values. Horizontal carriage position is controlled so that extra space on a line is distributed by increasing the space between individual characters depending upon the results of calculations determining pairs of pitch values and character quantities for each line of text.

4 Claims, 4 Drawing Figures

CHARACTER SPACED JUSTIFICATION METHOD AND APPARATUS

BACKGROUND OF THE INVENTION

This invention relates to a method for performing true right justification of text applicable to character printers utilizing variable character spacing and more particularly to a method for producing a printed line of text after calculating pitch values and character distribution so that character spaced justification is achieved.

Although not limited to use with letter quality printers, the present invention is particularly useful in achieving character spaced justification on a letter quality printer with variable character pitch settings. Right hand justification for printwheel type printers as currently implemented justifies text by inserting extra space between each word on a line. Since this method often causes large spaces to appear between words, a page of finished text produced under systems currently in use generally contains noticeable aggregations of spaces between words. The overall effect is that gaps between words unit to create snake-like divisions running from the top to the bottom of the page. These divisions may be referred to as "rivers" of space.

The character spaced justification method of the present invention not only eliminates "rivers" resulting from word spacing, it also is designed to conceal random patterns in character spacings. In cooperation with this method, relatively inexpensive apparatus may be used to produce character spaced justification of text. Prior art systems have not satisfied the demand for such method and apparatus.

SUMMARY OF THE INVENTION

A character spaced justification method and apparatus is shown for use in association with a printwheel type letter quality printer with variable character pitch settings defined in increments which designate the minimum horizontal movement of the print head, and for use in association with a word processing terminal that provides file management, text editing and an input-/output port formatted in a fixed line length, a procedure for producing character spaced justified text with the aid of a dedicated microprocessor.

A microprocesser based unit is designed to allow a type-setting word processing terminal to access all printable characters and the basic command codes of a correspondence-quality, high volume, printwheel type, production printer capable of variable character pitch settings. The microprocessor employs an 8-bit data bus, a 16-bit address bus, and seventy-two instructions. A single Asynchronous Communication Interface Adapter (ACIA) is used to interface serial data to a bus organized microcomputer. Communication operates at 1,200 baud. One Peripheral Interface Adapter (PIA) interfaces the operator's controls to the microprocessor. In addition to the microprocesor with input/output capabilities, the microcomputer includes 8K bytes of programmable Read Only Memory (PROM) and 1K byte of static Random-Access Memory (RAM). Residing in 2K of the PROM memory is a program designed to take features of the terminal intended for typesetting use and map them into features available in a letter quality printer. Also residing in the PROM is a method for providing character spaced justification of printed text.

Instructions are read from the PROM so that the microprocessor can count characters sent into the ACIA in serial fashion. As each character is counted, spaces or hyphens are recorded as breakpoints. Each time a new breakpoint is reached in any given line of text, the old breakpoint is deleted and a new breakpoint substituted in its place.

Once enough characters have been serially entered into the microprocessor, a comparison between the character count and the known value representing the total number of increments available for each line of text will indicate equivalence. When the comparison indicates equivalence, the microprocessor will then calculate the number of characters from the left margin of the line right to the breakpoint (delimiter point). The number of horizontal line increments between the breakpoint (delimiter) and the right margin is also calculated at this time.

A ratio is taken between the number of increments found to the right of the breakpoint and the number of characters found to the left of the breakpoint. With the number of characters as the divisor, a test is performed to determine whether the quotient is greater than one. If the quotient is greater than one, the portion of the quotient to the right of the decimal is truncated and the integer portion added to the original pitch, thereby calculating the changed pitch to be used for one portion of the line of text during printing. An integer value representing the remainder is also developed.

If the ratio is less than one, the remainder is simply a number corresponding to the number of increments to the right of the breakpoint. If the ratio is more than one, the remainder is the result of the subtraction of the number of characters to the left of the breakpoint from the minuend formed by the number of increments to the right of the breakpoint. Of course, if the ratio is two or greater, the subtrahend must first be multiplied by the integer portion of the quotient. The remainder determines the quantity of characters on the line that will be printed at a pitch one increment greater than that previously determined by adding the integer portion of the quotient (if any) to the original pitch. Since the total number of increments in a line is constant, quantities of characters in the line to be printed at each pitch are determined by the remainder.

It will be seen that each line is printed at two different pitch settings. Lines in which the characters to be printed at the higher pitch are printed toward the end of the line are alternated with lines in which the characters to be printed at the lower pitch are printed toward the end of the line. This results in the concealment of any random patterns of character spacings that might appear from a casual inspection of the document.

After a line has been printed, those characters that were to the right of the breakpoint when full line equivalence was determined are placed in a "start of line" buffer and the breakpoint is set to the left margin. The process is then repeated for each line of text.

BRIEF DESCRIPTION OF THE DRAWINGS

The present invention can be better understood by reading the following detailed description of the preferred method and embodiment with reference to the accompanying drawings wherein.

DESCRIPTION OF THE PREFERRED EMBODIMENTS

Figure 1:
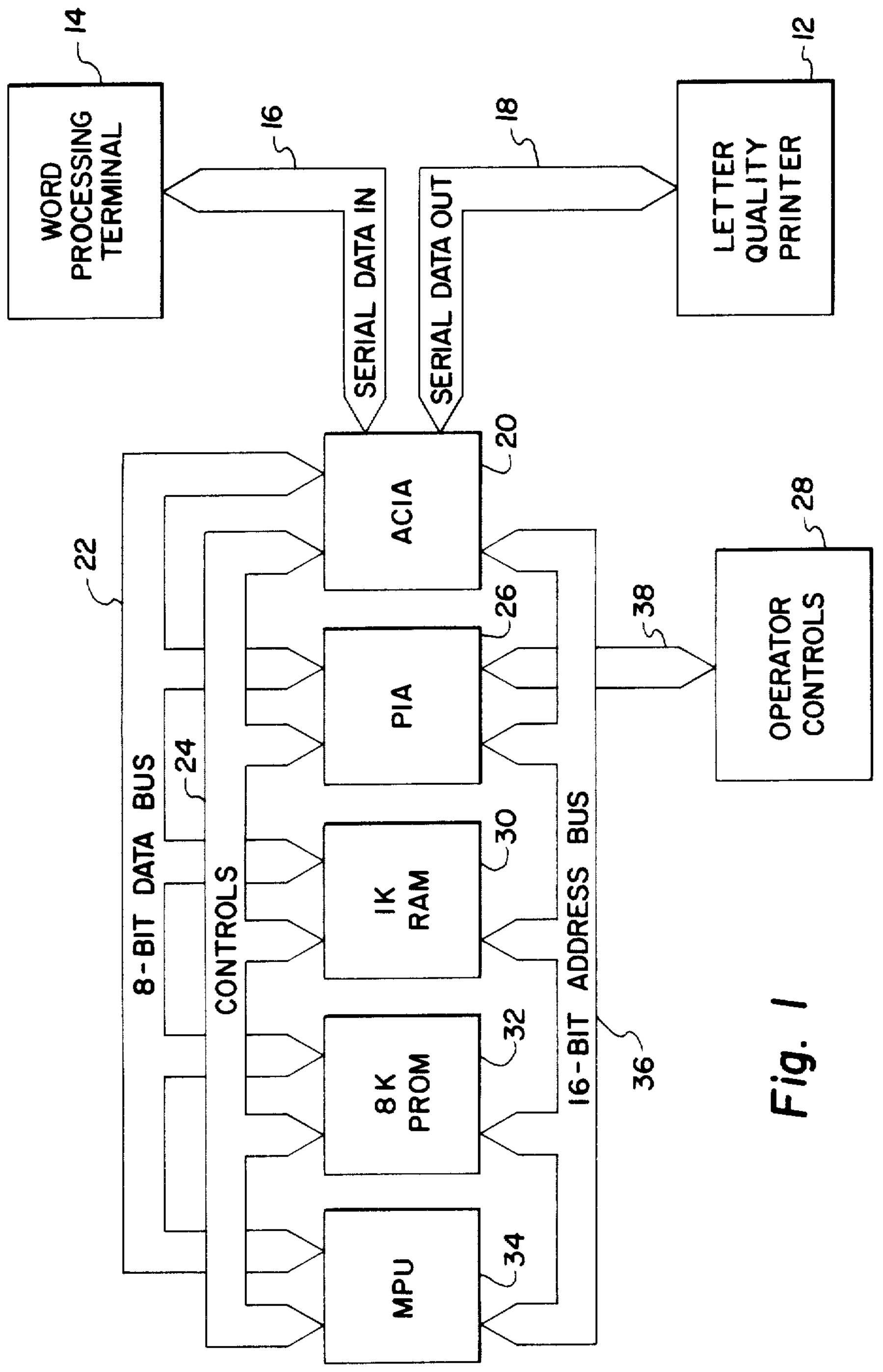
FIG. 1 is a block diagram of the apparatus used to implement the method of the present invention.

Looking first at FIG. 1, a block diagram of the apparatus used to implement the method of the present invention is shown which includes elements of a bus organized microcomputer. The elements of the microcomputer of FIG. 1 comprise a microprocessor (MPU) 34, an 8K byte Programable Read-Only Memory (PROM) 32, a 1K byte Random-Access Memory (RAM) 30, a Peripheral Interface Adapter (PIA) 26, and an Asynchronous Communication Interface Adapter (ACIA) 20. The microprocessor employs an 8-bit data bus 22, a 16-bit address bus 36, a control bus 24, along with serial communications cables 38, 16, and 18 of conventional design. Operator controls 28 are input to the microcomputer by grounding individual pins on the PIA which are programmed as inputs.

The foregoing elements comprise an Asynchronous Communications Intelligent Interface (ACII) in the form of a microcomputer designed to allow a typesetting word processing terminal to access all printable characters and basic command codes of a printwheel printer and to provide additional control codes to obtain correspondence quality type written text. According to the present invention, word processing terminal 14 is a terminal that provides file management, text editing and communication features for output primarily to a typesetting device. Terminal 14 has an input/output (I/O) port for a printer, but output from this port is formatted in a fixed line length, has no tab capability, and does not output a full character set under the American National Standard Code for Information Interchange (ASCII).

The printwheel printer presently proposed for use in the preferred embodiment is a letter-quality, high volume production printer 12. Printer 12 is of the printwheel variety having ninety-six (96) printable characters. Printer 12 currently has a command set containing fifty-five (55) commands. These commands allow the operator to set and activate margins. These commands also allow the operator to set and activate up to one hundred and fifty-nine (159) tabs and to move the print carriage to positions of one one hundred and twentieth (1/120) of an inch horizontally and one fourty-eighth (1/48) of an inch vertically.

The microcomputer of FIG. 1 is designed to take the features in a terminal intended for typesetting use and map them into features available in a letter-quality printer 12. By connecting the microcomputer of FIG. 1 to the input/output (I/O) port on the terminal 14, the typesetter port is able to generate a more complete ASCII character set. Table 1 below is a map of the keyboard characters of the terminal 14 versus the printwheel characters of printer 12 in ascending ASCII code order. The ASCII escape code is the control code used for the extended command set available in the printer 12. The escape code is generated preceding the typesetting codes in the shift position. The microcomputer of FIG. 1 is to be programmed to map the shifted typesetting control codes into printer control codes. Table 2 below is a summary of the command set used by the microcomputer of FIG. 1 and employed by that microcomputer to control the printer 12. It will be understood that the scope of the present invention is not confined to this current preferred embodiment and is in no way limited to the use of a typesetting terminal.

TABLE 1

| ASCII CODE | KEYBOARD CHARACTER | PRINTWHEEL CHARACTER |
|---|---|---|
| ØØ (NUL) | Discretionary Hyphen* | Break |
| Ø1 (SOH) | | |
| Ø2 (STX) | | |
| Ø3 (ETX) | | |
| Ø4 (EOT) | | |
| Ø5 (ENQ) | | |
| Ø6 (ACK) | | |
| Ø7 (BEL) | Bell* | Bell |
| Ø8 (BS) | | |
| Ø9 (HT) | | |
| ØA (LF) | Elevate* | Line Feed |
| ØB (VT) | | |
| ØC (FF) | Lower Magazine* | Form Feed |
| ØD (CR) | Carriage Return* | Carriage Return |
| ØE (SO) | Force Unshift* | End of Text |
| ØF (SI) | Force Shift* | Start of Text |
| 1Ø (DLE) | | |
| 11 (DC1 | | |
| 12 (DC2 | | |
| 13 (DC3 | | |
| 14 (DC4 | | |
| 15 (NAK | | |
| 16 (SYN | | |
| 17 (ETB | | |
| 18 (CAN | | |
| 19 (EM) | EM Space* | Horizontal Tab |
| 1A (SUB) | | |
| 1B (ESC) | | |
| 1C (FS) | | |
| 1D (GS) | THN Space* | Backspace |
| 1E (RS) | EN Space* | Non-Discretionary Char. |
| 1F (US) | | |
| 20 (SP) | Space* | Space |
| 21 (!) | ! | ! |
| 22 (") | Super Shift* | " |
| 23 (#) | EN Leader | # |
| 24 ($) | $ | $ |
| 25 (%) | Upper Case Precedence* | % |
| 26 (&) | & | & |
| 27 (') | | ' |
| 28 (( ) | ( | ( |
| 29 ( )) | ) | ) |
| 2A (*) | EM Leader* | * |
| 2B (+) | + | + |
| 2C (,) | , | , |
| 2D (−) | − | − |
| 2E (.) | . | . |
| 2F (/) | Lower Case Precedence* | / |
| 30 (Ø) | Ø | Ø |
| 31 (1) | 1 | 1 |
| 32 (2) | 2 | 2 |
| 33 (3) | 3 | 3 |
| 34 (4) | 4 | 4 |
| 35 (5) | 5 | 5 |
| 36 (6) | 6 | 6 |
| 37 (7) | 7 | 7 |
| 38 (8) | 8 | 8 |
| 39 (9) | 9 | 9 |
| 3A (:) | : | : |
| 3B (;) | ; | ; |
| 3C ( ) | Quad Left* | < |
| 3D (=) | Insert Space* | = |
| 3E ( ) | Upper Magazine* | > |
| 3F (?) | ? | ? |
| 4Ø (@) | Lower Rail* | @ |
| 41 (A) | A | A |
| 42 (B) | B | B |
| 43 (C) | C | C |
| 44 (D) | D | D |
| 45 (E) | E | E |
| 46 (F) | F | F |
| 47 (G) | G | G |
| 48 (H) | H | H |
| 49 (I) | I | I |
| 4A (J) | J | J |
| 4B (K) | K | K |
| 4C (L) | L | L |

TABLE 1-continued

| ASCII CODE | KEYBOARD CHARACTER | PRINTWHEEL CHARACTER |
|---|---|---|
| 4D (M) | M | M |
| 4E (N) | N | N |
| 4F (O) | O | O |
| 5Ø (P) | P | P |
| 51 (Q) | Q | Q |
| 52 (R) | R | R |
| 53 (S) | S | S |
| 54 (T) | T | T |
| 55 (U) | U | U |
| 56 (V) | V | V |
| 57 (W) | W | W |
| 58 (X) | X | X |
| 59 (Y) | Y | Y |
| 5A (Z) | Z | Z |
| 5B ( [ ) | $\frac{1}{8}$ | [ |
| 5C (  ) | $\frac{1}{4}$ | |
| 5D ( ] ) | $\frac{3}{8}$ | ] |
| 5E (  ) | Upper Rail* | |
| 5F (_) | — | — |
| 6Ø (') | ' | · |
| 61 (a) | a | a |
| 62 (b) | b | b |
| 63 (c) | c | c |
| 64 (d) | d | d |
| 65 (e) | e | e |
| 66 (f) | f | f |
| 67 (g) | g | g |
| 68 (h) | h | h |
| 69 (i) | i | i |
| 6A (j) | j | j |
| 6B (k) | k | k |
| 6C (l) | l | l |
| 6D (m) | m | m |
| 6E (n) | n | n |
| 6F (o) | o | o |
| 7Ø (p) | p | p |
| 71 (q) | q | q |
| 72 (r) | r | r |
| 73 (s) | s | s |
| 74 (t) | t | t |
| 75 (u) | u | u |
| 76 (v) | v | v |
| 77 (w) | w | w |
| 78 (x) | x | x |
| 79 (y) | y | y |
| 7A (z) | z | z |
| 7B ( ) | $\frac{1}{2}$ | |
| 7C ( ) | $\frac{5}{8}$ | |
| 7D ( ) | $\frac{3}{4}$ | |
| 7E ( ) | $\frac{7}{8}$ | TM |
| 7F (DEL) | RUBOUT* | Upper Case Rubout for ESC |

*Keyboard character shown is unshifted, shifting will precede the character with ESC.

TABLE 2

| CODES | FUNCTION |
|---|---|
| SP | Space |
| BS | Backspace |
| CR | Carriage Return |
| LF | Line Feed |
| HT | Horizontal Tab |
| FF | Form Feed |
| RS | Non-Discretionary Character |
| SI | Start of Text to be Printed |
| SO | End of Text to be Printed |
| ESC D | Negative Half-Line Feed |
| ESC U | Half-Line Feed |
| ESC LF | Negative Line Feed |
| ESC SP | Print Character at Position ØØ4 |
| ESC / | Print Character at Position ØØ2 |
| ESC 1 | Set Individual Horizontal Tab Stops |
| ESC 2 | Clear All Horizontal Tab Stops |
| ESC 8 | Clear Individual Horizontal Tab Stops |
| ESC 9 | Set Left Margin |
| ESC Ø | Set Right Margin |
| ESC A | Ribbon Drop |

TABLE 2-continued

| CODES | FUNCTION |
|---|---|
| ESC B | Ribbon Up |
| ESC L | Define Vertical Spacing Increments |
| ESC E | Define Horizontal Spacing Increments |
| ESC F | Define Form Length |
| ESC( (List). | Set Tab List |
| ESC) (List) | Clear Tab List |
| ESC N | No Escapement on Next Character Only |
| ESC Y | Define Text Length |
| ESC C | Absolute Horizontal Tab |
| ESC P | Absolute Vertical Tab |
| ESC H | Relative Horizontal Tab |
| ESC V | Relative Vertical Tab |
| ESC Z (List) CR | Center Text |
| ESC 5 | Forward Print |
| ESC 6 | Backward Print |
| ESC R | Repeat Character |

The microcomputer program consists of seven basic modules. The modules are RESET, HEAD, TEXT, ESC, PAG, SUB, and I/O. The RESET module initializes the microprocessor, I/O ports and stores default values into the memory locations used for program variables. The HEAD program determines which data is text to be printed and which is not. If the data is a printable character of text, the TEXT module does the mapping and keeps track of horizontal carriage position. If the data is not text, control codes are examined in the ESC module. Both the TEXT and the ESC modules turn control over to the PAG module which keeps track of vertical carriage position. SUB is a collection of service subroutines used by the other modules to read, write, or store characters and to calculate dimensional values. Loop iterations are accomplished by the PAG module turning control back over to the HEAD module. I/O is a set of interrupt driven routines which stores characters received from the teletype terminal and output characters to the printer. The input routines stores characters to be processed by TEXT in an input buffer. The output routine works from an output buffer built by TEXT. These interrupt driven routines eliminate any noticeable lag time which might be noticeable otherwise.

Iterations are initiated by receipt of serial data by the bus organized microcomputer. Communication of serial data is accomplished by an interface compatable with the Electronic Industries Association RS-232C serial interface operating at 1,200 baud under a high speed simplex communication protocol. Information is carried in only one direction by an RS232C serial communication cable 16 from terminal 14 to the interface 20. Similarly, an RS232C serial communication cable 18 connects printer 12 to interface 20.

In using RS-232C serial interface, equipment status lines indicate whether the equipment is ready to send or receive data. The signal for terminal equipment is DATA TERMINAL READY. There are two transmission control signals: REQUEST TO SEND and CLEAR TO SEND. The terminal activates the REQUEST TO SEND signal when it has data to transmit. The microcomputer responds with the CLEAR TO SEND signal when it is ready to receive the data. These signals are implemented by the asynchronous communications interface adapter 20. Timing signals in the RS-232C interface may be used to locate the centers of data bits.

The RS-232 interface is widely used at low-to-medium data rates. Electronic devices that meet the RS-232 specifications are cheap and widely available.

Microprocessor 34 is designed to use LSI serial interface chips in its I/O section. It has no special I/O instructions or control signals. The I/O is based on the Peripheral Interface Adapter (PIA) 26.

The microprocessor 34 and the PIA 26 are designed so that any instruction that references memory can perform an I/O operation. The instructions ADD, SUBTRACT, AND, OR, EXCLUSIVE OR, and other instructions can have one operand in an accumulator and the other at an input port. The instruction STORE transfers eight bits of data from an accumulator to an output port. The instruction LOAD transfers eight bits of data from an input port to an accumulator. The instruction CLEAR clears an output port. The instruction TEST sets flags according to the data at an input port. The instruction COMPARE sets the flags as if the data at an input port had been subtracted from the contents of an accumulator.

Input and output ports should be latched and buffered. Address lines A(15) and A(14) are used for the purpose of differentiating between PIA addresses and memory addresses. These address lines are found on the PIA known as Motorola 6820 and are particularly convenient, since each PIA 26 has one active-low and two active-high chip selects. The differentiation between I/O and memory requires one active-high and one activelow chip select, leaving one active-high select available for addressing different PIAs, if any.

Depending on the embodiment, complete decoding of PIA addresses may be necessary if I/O addresses are limited to a very small area of memory. Alternative embodiments may use I/O sections having a linear select with a specific address bit tied to each of several PIAs. The Motorola 6820 PIA, for example, uses bits A(0) and A(1) internally. Bits A(2) through A(13) are available to select 24 PIAs. If more address bits are used for memory, fewer will be available for simple decoding of PIA addresses.

Since the PIA has no data input latch, a TTL latch will be necessary if the data is only briefly available. The PIA will not directly drive output lines; so a buffer can be used to provide higher drive currents. The PIA occupies only eight memory locations of the microcomputer.

The hardware interface for the microprocessor 34 and for the printer 12 and the terminal 14 is the asynchronous communications interface adapter 20. In alternative embodiments, a universal asynchronous receiver/transmitter (UART) with tri-state outputs specifically designed for use with the microprocessor may be necessary to complete the interface with a modem. The asynchronous communications interface adapter (ACIA) 20 occupies two memory locations and contains two read-only registers and two write-only registers. The read-only registers receive data and status. The write-only registers transmit data and control.

Serial asynchronous data transmission employs special bits which are inserted at both ends of the character code. Each character consists of three parts: a start bit, the data bits, and stop bits. The transmitter rests at the 1-state when no message is transmitted. The first bit, called the start bit, is always a 0 and is used to indicate the beginning of a character. A character can be detected by the microcomputer according to four rules: (1) When data are not being sent, the line is kept in the 1-state. (2) The initiation of a character transmission is detected by start bit 0. (3) The character bits always follow the start bit. (4) When the last character bit is transmitted, a stop bit is detected when the line returns to the 1-state for at least 1 bit time.

Using these rules, the interface can detect the start bit when the line goes from 1 to 0. A clock in the receiver interface may be used to allow examination of the line at proper bit times. The microprocessor knows the transfer rate of the bits and the number of information bits to expect. After the character bits are transmitted, one or two stop bits are sent. The stop bits are always in the 1-state and frame the end of character to signify the idle or wait state.

At the end of the message the line is held at the 1-state for a period of at least 1 or 2 bit times so that both the transmit and receive functions can resynchronize. The line will remain in the 1-state until another character is transmitted. The stop time insures that a new character will not follow for at least 2 bit times.

The ACIA is also capable of generating an Interrupt upon occurrence of these conditions: Transmit Data Register Empty (TDRE), Receive Data Register Full (RDRF), framing error, data overflow. Because the microprocessor 34 only allows one interrupt vector, a polling routine is used to determine the appropriate action. A TDRE would start the output routine and a RDRF would generate the input routine. The other two represent error conditions which would warrant appropriate action.

The only required action to the ACIA is to set its initial control bits at the first of the program during HEAD. This includes setting the appropriate baud rate; stop bits, data length, and enabling the proper interrupts. Whenever the program is ready to accept data, the RDRF interrupt is enabled. Whenever data is ready for output, the TDRE interrupt is enabled. Both routines utilize circular buffers which are also accessed by the main body of the program during SUB. The READ routine gets a character from the buffer filled by the input interrupt routine. The WRITE subroutine fills a buffer which is then emptied by the output interrupt routine.

This technique is used due to the lag time caused by transmitting and receiving data on a serial port. At 1200 baud characters are generated at approximately 120 per second or 1 character every 8⅓ millisecond. The standard instruction is 3 microseconds. In utilizing this routine unnecessary waiting for serial ports to finish is eliminated. It also helps eliminate the lag which might be caused by the computations needed for the character spaced justification.

In the preferred embodiment, one ACIA is used to interface both the terminal 14 and the printer 12 to the microcomputer of FIG. 1. Operator controls are input to the microcomputer by grounding individual pins on the PIA which are programmed as inputs. A simple set of push buttons and switches may be used for operator controls.

The buttons and switches are associated to specific bits in the PIA. To check a switch position on the panel, the program checks to see if that bit position is a 1 or 0 signifying its state. The following routine tests to see if the "AUTO CR" switch is on.

```
* Check Auto CR Switch
LDA        ACRSW        ; Load a with switch mask
```

-continued

```
CMPA    PIA1    ; Test position
BEQ     ON      ; 1 signifies on
BRA     OFF     ; 0 off
```

For Push Buttons, the routine is slightly different. At several points in the routine, the microprocessor may require operator intervention. In this instance, the program will poll the appropriate PIA bits to see if one has been applied (Set to 1), if so the appropriate routine should be called to respond. In the following example, the routine is waiting for an "Insert Hyphen", "next character", or "Insert CR" Button being depressed. Note that a subroutine PUSHB is utilized to ensure that the duration of the signal is at least 100 milliseconds.

```
        * Check for insert hyphen
        LDA     HYPMSK      ; Pass mask in A
        JSR     PUSHB       ; Button pushed?
        TST     BLFAG       ; 1 means Yes
        BNE     HYPHEN      ; insert hyphen
        * Check for next character
        LDA     NXTMS5K     ; Pass mask in A
        TSR     PUSHB       ; Button pushed?
        TST     BFLAG       ;
        BNE     NXTCHAR     ; Add next character
        * Check for Insert CR
        LDA     CRMSK       ; Pass mask in A
        JSR     PUSHB       ; Pushed
        TST     BFLAG
        BNE     INSCR       ; Insert CR
        * Push Button Subroutine
PUSHB   CLR     BFLAG       ; Clear Button Flag
        CLX                 ; Clear Timing Register
LOOP    CMPA    PIA1        ; Bit High
        BNE     OUT         ; No
        INX
        BGE     Loop        ; Wait til X overflows
        INC     BFLAG       ; Set Button Flag
OUT     RTS
```

In the preferred embodiment, the I/O section has many ports and must have a busing structure that shares the data and address buses with the memory section. The present embodiment employs memory-mapped I/O for this purpose. I/O ports are treated exactly the same as memory locations. The busing structure of the present embodiment includes 8-bit data bus 22, and 16-bit address bus 36. No separate decoding or control system is necessary for input and output.

The on-board memory for the microprocessor of FIG. 1 includes 1K RAM 30 and 8K PROM 32. The on-board memory is mapped so that, beginning with 03FF (hex) RAM memory locations, variables are contained in locations 0000 (hex) to 002F (hex). Buffers are contained in locations 0030 (hex) to 037F (hex). The stack occupies locations 0380 (hex) to 03FF (hex). This completes the map of the RAM 30 memory. Continuing with the PROM 32 memory, location D000 (hex) defines the beginning of the PROM 32 memory; and location FFF (hex) defines the end. The PIA's occupy locations 8400 (hex) to 8707 (hex). The ACIA 20 occupies locations 8408 (hex) and 8409 (hex). The program resides in locations D800 (hex) to DFFF (hex). The remaining locations in the PROM 32 are not used.

Figure 2A:
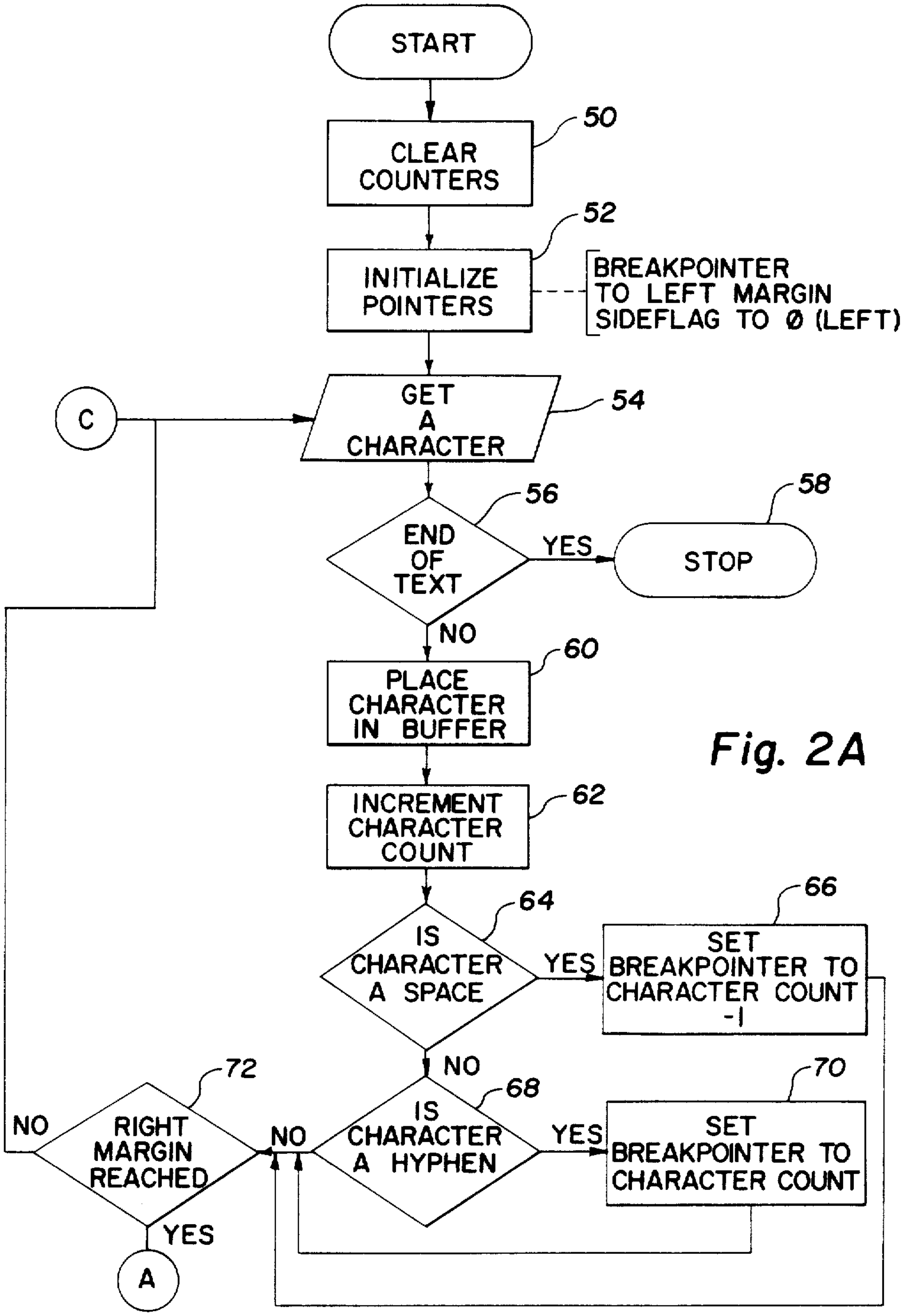
FIGS. 2A, 2B, and 2C comprise, a flowchart for a sequence of machine readable instructions to be stored in the PROM, according to the present invention.
Figure 2B:
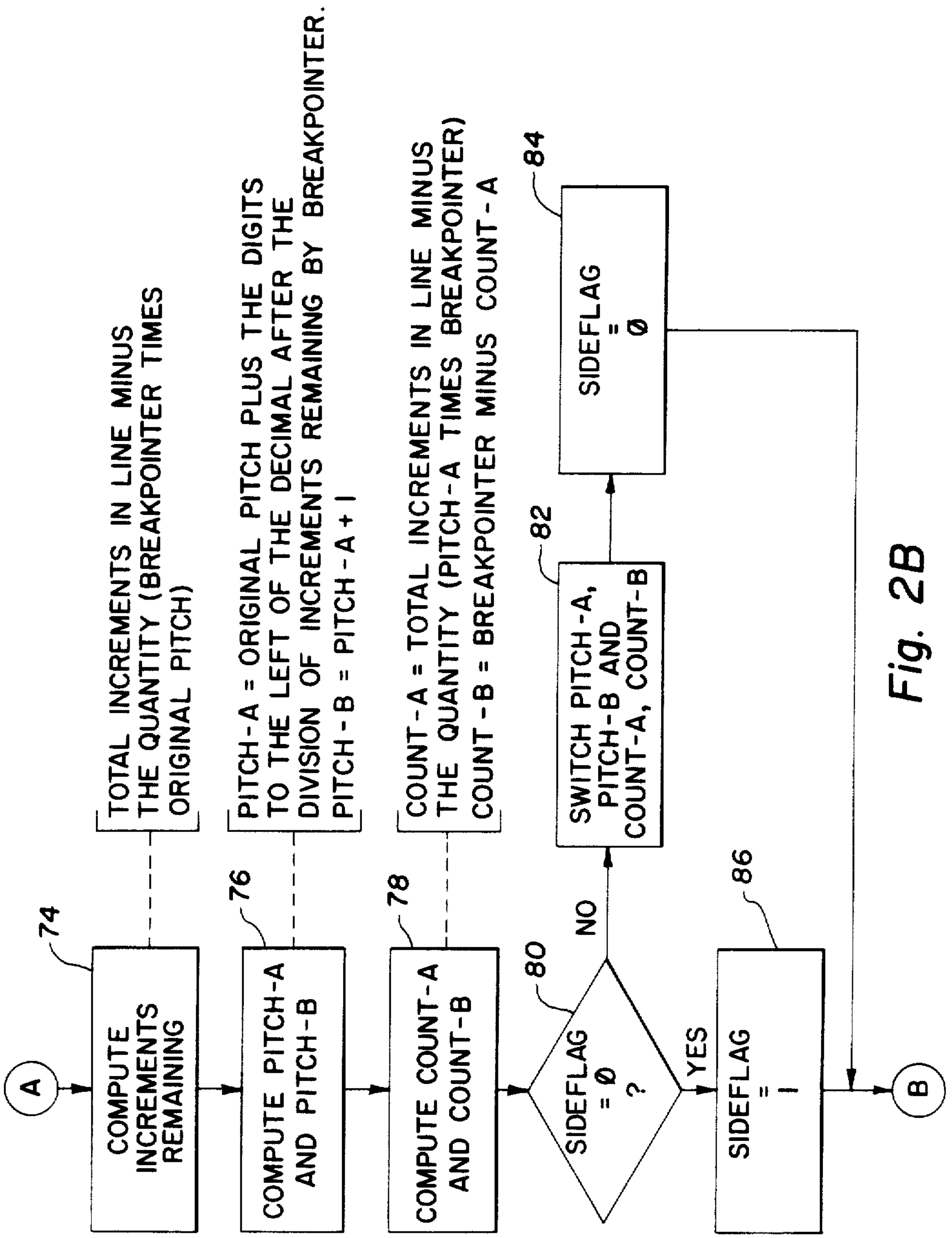
Figure 2C:
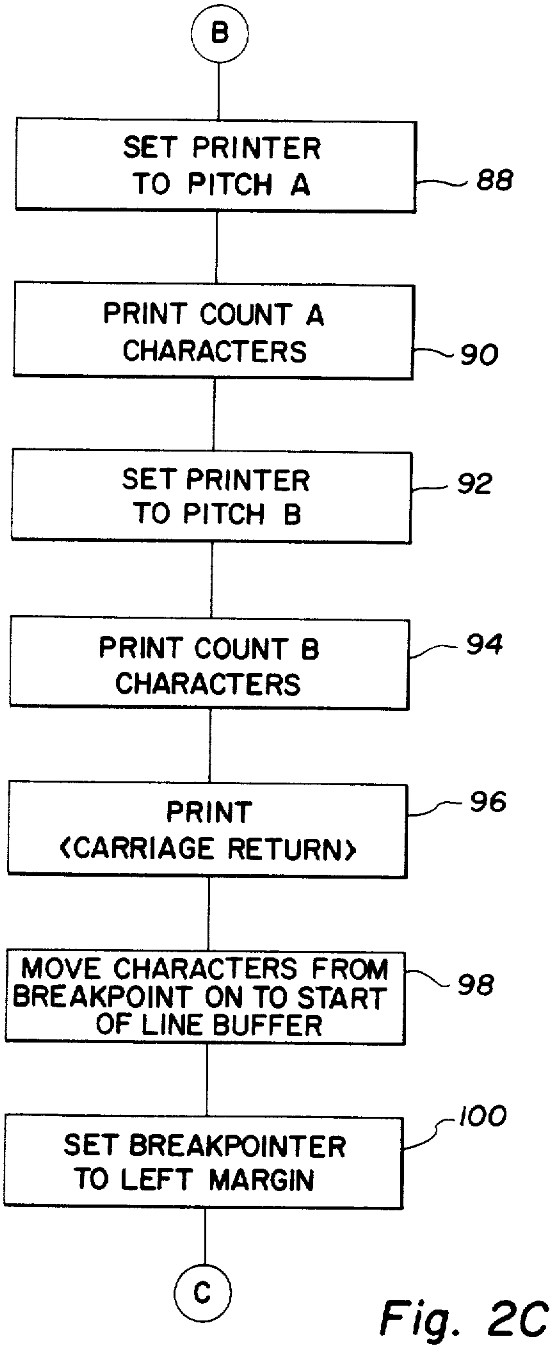

Turning now to the program to be executed by the microprocessor 34 to produce character spaced justification on a letter quality printer, a better understanding of the method of the present invention will be obtained by reference to FIG. 2 of the drawings and the following discussion. The following routine will constitute one of the subroutines maintained in the SUB module of the overall program.

The character spaced justification routine begins by clearing counters 50 by moving zeros into all registers functioning as counters for the program. The next step is the initialization of pointers 52 by storing values representing the left and right margins of the text and by setting the breakpointer equal to the value of the left margin. In the same step, a 1-bit flipflop called "sideflag" is set to zero in order to indicate a left condition.

The next step is to receive a character from I/O. This is done at the block labeled "Get a Character" 54. The receipt of a character is controlled by the ACIA 20 under a program similar to that previously illustrated.

In the next step, the character is examined to see whether the end of the test has been reached. The block representing this step is "End of Text" 56. If the end of text condition is satisfied, execution is terminated as shown by the block labeled "Stop" 58. If the condition is not satisfied, the next step is to "Place Character in Buffer" 60, causing the character to be temporarily stored.

Following storage of the character, the next step is "Increment Character Counter" 62 by adding one to the register holding the accumulated character total.

The next step is to examine the character to determine whether it is a space or a hyphen. If the determination represented by the block labeled "Is Character a Space?" 64 shows the condition to be satisfied, the register containing the value known as "Breakpoint" will be set equal to the current total of the character count accumulator less one. The block representing the setting of the breakpointer if the character is a space is labeled "Set Breakpointer to Character Count—1" 66. If the space condition is not satisfied during the test performed on the character, the next step is to determine if the character is a hyphen. The ASCII code for a hyphen is compared to the character code in the buffer. If the codes match, the condition represented by the box labeled "Is Character a Hyphen" 68 is satisfied, whereupon the register containing the value "breakpointer" is set equal to the current character count as determined in "Increment Character Count" 62. The setting of the "breakpointer" after a positive hyphen test is represented in FIG. 2 by the block labeled "Set Breakpointer to Character Count" 70.

Following the test for spaces and hyphens, a test is made to determine whether enough characters are in the buffer to fill out a line of text. This text is represented in the flowchart of FIG. 2 by the diamond labeled "Right Margin Reached" 72. This test is performed by comparing the number of characters capable of being fit on to a single line of text with the value contained in the register "Character Count". If the values are equal, the right margin has been reached and the condition is satisfied. If the condition is not satisfied, the routine begins again by receiving a new character as represented in the flowchart of FIG. 2 by the block labeled "Get a Character" 54. With the new character, the sequence will be repeated as before.

If the right margin condition is satisfied, control will be transferred from the TEXT module to the SUB module for the following computations. The first operation to be performed after the right margin test is satisfied is the computation of the increments remaining on the line after the last position represented by the value contained in "breakpointer". This operation is symbolized by the block label "Compute Increments Remaining" 74. The total increments in the line were determined by the settings of the left and right margins as initialized in block 52 above. This total increment value is reduced by the product of the value contained in "breakpointer" and the value representing the original pitch of the printer. Pitch is commonly defined as the spacing between characters. In the current embodiment, the pitch will total approximately 10 or 12 increments for each character. The original pitch is selected by the terminal operator and its value is stored for reference by the program.

After increments remaining have been computed, the next operation is to compute two different pitch values P(1) and P(2). The computation is indicated by the block in the flowchart of FIG. 2 labeled "Compute Pitch-A and Pitch-B" 76. This computation is performed by adding to the value of the original pitch P(0) the integer portion of the quotient created by dividing the value "increments remaining" R by the value contained in "breakpointer" B. "Breakpointer" B represents the number of characters to be printed on the line. "Increments remaining" R represents the number of increments on the line that would be empty between the last character and the right margin if pitch remained P(0), the original pitch. When the integer portion of the quotient is added to the original pitch P(0), a new pitch P(1) is represented by the sum.

After computing new pitch P(1), a second pitch P(2) is computed as equal to the sum of P(1) and the integer 1.

The next step is to compute the number of characters to be printed at each of the new pitch values P(1) and P(2). This step is indicated by the block labeled "Compute Count-A and Count-B" 78. The number of characters to be printed at the pitch value P(1) is designated "Count-A" or C(1). The number of characters to be printed at pitch value P(2) is designated "Count-B" or C(1). The value C(1) represents the total number of increments in the print line reduced by the product of pitch value P(1) and the breakpointer value B. The value of C(2) is then set equal to breâkpointer B minus C(1).

After these computations are performed, the sideflag flip-flop is tested as indicated by the diamond labeled "Sideflag=0?" 80. The purpose of this test is to alternate between two line print configurations. The first configuration causes the characters associated with new pitch value P(1) to be printed first on the line. The second configuration causes the characters associated with new pitch value P(2) to be printed first on the print line. For the purposes of discussion, "first" here is to be taken to mean "first from the left", since the printer may print backwards and forwards.

If the sideflag bit is not zero, the contents of the memory locations of P(1) and P(2) are interchanged; and the contents of memory locations for C(1) and C(2) are also interchanged. The sideflag bit is then reset to zero.

If the sideflag bit is equal to zero, the contents of the registers containing pitch values and the contents of the registers containing values representing the numbers of characters to be printed with each pitch value are not changed. Sideflag is merely set to 1 if the condition is satisfied. Control is then transferred back to the TEXT module where the print sequence is executed.

The first step of the print sequence is to set the printer to the pitch represented by the contents of P(1). This step is indicated by the block labeled "Set Printer to Pitch A" 88. The next step is to print the number of characters C(1) that are to be associated with pitch value P(1). The printing of characters at pitch value P(1) is shown as a block labeled "Print Count-A Characters" 90. The next two steps are to set printer to the pitch represented by pitch value P(2) and print the number of characters C(2) that are associated with that pitch. These steps are designated in FIG. 2C by blocks labeled "Set Printer to Pitch B" 92 and "Print Count B Characters" 94.

After the line is printed, the characters that remain in the buffer of block 80 are moved to a location representing the first characters of the next line. This move is indicated by the block labeled "Move Characters from Breakpoint On to Start of Line Buffer" 98.

As a final step before beginning the loop again with the input of a new character, the value contained in the breakpointer register is set equal to the value contained in the left margin register. This operation on the breakpointer value B is shown by the block labeled "Set Breakpointer to Left Margin" 100. After the breakpointer is changed for service in the next loop, a new character is read and the process for printing the next line begins. The process repeats until the end of text condition is satisfied.

While the flowchart of FIG. 2 is the current best embodiment of the method of the present invention, it will be appreciated that this invention includes within its scope every method of creating character spaced justification applicable to high speed character printers utilizing variable character spacing. The basic elements of this process will now be defined.

Character spaced justification distributes extra space on a line by increasing the space between individual characters. This is accomplished by adjusting character ptich.

In justifying text, words are normally broken at the last available space on the line or after a hyphen. These are referred to as delimiter points. A break at the last delimiter point to the immediate left of the right margin leaves a specific number of carriage increments to be distributed throughout the line in connection with character positions necessary to create a blocked right margin. On the printwheel printer used in the current embodiment, the character spacing, or pitch, is defined in increments which designate the minimum horizontal movement of the print head. The operator originally sets a character pitch or utilizes a default setting for character pitch. Given the original pitch setting and the printer's ability to print at varied character spacing to distribute extra spaces on a line, this method is able to produce character spaced justification of text. The only additional information needed is the total number of increments per line of type. This information is derived from the margin settings on each side of the printer.

In normal operation, the text of the material is set into an input/output register in serial fashion using serial data lines 16 as previously described in connection with FIG. 1. Through the ACIA interface 20 of FIG. 1, the microprocessor 34 counts each entering character. Spaces or hyphens in the string of characters are noted as delimeters. Each time a new delimiter is reached in a string of characters, a value corresponding to the position of the latest delimiter is substituted for the existing value in the breakpoint register. By this means, the microprocessor preserves a cut-off point for the character string to be used when the characters have consumed all of the increments available on a single line of text.

When the text has been broken at a specific spot in the line, the method produces the number of characters from the left margin up to the delimiter and the number of increments between the delimiter and the right margin. By dividing the number of characters, the increase in character pitch necessary for line justification is determined. The number of characters referred to is, of course, the number of characters up to the last delimiter. Once enough characters have been received to constitute a line of text, the characters to the right of the last delimiter are disregarded until the next line is begun. The characters between the left margin and the breakpoint, inclusive, are stored in RAM 30 of FIG. 1.

The division of increments remaining in the line after the last delimiter by the number of characters received up to the last delimiter produces a quotient. No significant digits to the right of the decimal are allowed in this quotient. However, a remainder is retained representing the lost places to the right of the decimal.

The integer portion of the quotient is equal to the increase in pitch for the entire line of text. The original pitch is increased by the integer portion of the quotient. The remainder is equal to the number of characters in the line that are to be printed at a pitch one increment larger than the pitch established for the rest of the line by the addition of the integer portion to the quotient. This means that a number of characters equal to the remainder are printed at a pitch equal to the original pitch, plus the integer portion of the quotient, plus one. The rest of the characters are printed at a pitch equal to the original pitch plus the integer portion of the quotient. On alternate lines, the remainder is spread out over the end portion of the line rather than the first portion of the line.

The line with the new pitch settings is fed back through the ACIA 20 to printer 12 of FIG. 1. A line is printed.

An example will clarify the method. Using an original pitch of 10, if 50 characters exist up to the delimiter, and 3 characters remain on the line after the last delimiter, and there are 10 increments per character, the pitch change equation would be as follows:

$$\frac{30\ \text{Increments}}{50\ \text{Characters}} = 0 \text{ integer quotient, plus remainder.}$$

It will be seen that the remainder is 30. This means that thirty increments must be distributed amoung thirty characters. Twenty characters will not be required to take on an additional increment. This is the same as saying that the pitch will be increased from 10 to 11 for 30 of the characters on the line. The first twenty characters will be printed at 10 pitch (original pitch plus 0 integer quotient), and the next thirty characters will be printed at 11 pitch (one increment larger than the pitch of the first twenty characters). On the next line the higher pitch increment will be printed first, so that each line alternates the position of the characters to be printed in the higher pitch.

Tab calls are treated as absolute moves of the printwheel and all text is justified to the right of the tab call only. This provides for an even indentation of paragraphs and columns. In addition, the underlining function is adjusted to make up for any spaces that might occur from the introduction of additional increments to the spacing of characters.

While the present invention and its method have been illustrated in terms of a particular procedure carried out on particular apparatus, it is apparent that various modifications and changes may be made within the scope of the present invention as defined by the appended claims. It could be implemented using isolated input/output in which memory and I/O addresses are decoded separately. It could also be implemented using attached input/output in which I/O ports are part of the CPU and memories and are activated by special instructions. It is also obvious by reference to FIG. 2 that blocks 50 and 52 could be reversed, that blocks 60 and 62 could be reversed, that diamonds 64 and 68 along with the respective blocks 66 and 70 could be exchanged, and that the right margin test could be delayed until after block 78 at the cost of some efficiency in the program.

With these understandings, the following claims are submitted:

I claim:

1. A method of operating a printwheel type letter quality printer for producing character spaced justified text with aid of a microprocessor comprising:

providing a data base for said letter quality printer to said microprocessor including at least,
an original pitch increment "P(O)", and
positions at which margins are set on said letter quality printer, said microprocessor using said positions to determine total increments in a line of text "T";

serially receiving a string of characters for a line of text into an interface from a terminal;

counting each character of said string of characters in counting means of said microprocessor as each said character enters said interface;

recording in recording means of said microprocessor an increment position of delimiters "B" at spaces or hyphens as said string of characters are counted by said counting means;

deleting said increment position from said recording means and substituting a new increment position for said delimiter "B" at each new space or hyphen as said string of characters is counted by said counting means;

comparing in comparing means of said microprocessor number of said characters of said line of text received with said text "T" to determine if enough of said characters have been received to form an intermediate line of text for justification, said comparing being repeated after receipt of each said character by said comparing means;

feeding said intermedite line of text up to a last of said delimiters "B" from said microprocessor to a random access memory for storage of said intermediate line of text when said intermediate line of text has been accumulated in said microprocessor;

calculating from said original pitch increment "P(O)" in said microprocessor number of increments "R" required to complete a justified line of text from said last of said delimiters "B" after said storage of said intermediate line of text;

first computing from said original pitch increment "P(0)" and increment "R" in said microprocessor a first pitch "P(1)" representing pitch to which said letter quality printer is set by said microprocessor for a first part of said justified line of text;

second computing from said original pitch increment "P(0)" and increment "R" in said microprocessor a second pitch "P(2)" representing pitch to which said letter quality printer is set by said microprocessor for a second part of said justified line of text;

activating said letter quality printer by said microprocessor to print said justified line of text from said random access memory when said first pitch "P(1)" and second pitch "P(2)" have been computed; and repeating said serially receiving, counting, recording, deleting, comparing, feeding, calculating, first computing, second computing and activating steps for each subsequent line of text.

2. The method of claim 1 wherein said first computing is switched with said second computing for said first pitch "P(1)" and said second pitch "P(2)", respectively, for each of said subsequent lines of text.

3. An apparatus for producing character spaced justified text comprising:

a microprocessor having a data base having stored therein an original pitch increment "P(0)" and set margins for lines of text "T" to give a predetermined number of increments;

a programmable read only memory (PROM) for storing interface and program instruction codes for operator controls and said microprocessor;

a random access memory (RAM) storing words therein as received from said microprocessor;

a peripheral interface adapter (PIA) performing input/output operations between said operator controls and said microprocessor;

an asynchronous communication interface adapter (ACIA) performing input/output operations between a word processing terminal and said microprocessor and between said RAM and a printwheel printer for printing letter-quality text, said printwheel printer having variable pitch;

an address bus connecting said microprocessor, PROM, RAM, PIA and ACIA;

a control bus connecting said microprocessor, PROM, RAM, PIA and ACIA;

said microprocessor including:

means for counting each character of a string of characters received from said word processing terminal via said ACIA;

means for recording increment position of a delimiter "B" at spaces or hyphens in said string of characters, said recording means updating said increment position of a delimiter "B" on receiving each additional space or hyphen;

means for comparing said number of said characters in said string of characters of said text "T" with said predetermined number of increments;

means for transferring an intermediate line of text to said RAM for storage therein as said stored word;

means for calculating from said original pitch increment "P(0)", said predetermined number of increments and said number of said characters in said intermediate line of text a first pitch "P(1)" for a first portion of a justified line of text and a second pitch "P(2)" for a second portion of said justified line of text; and means for activating said printwheel printer to print said intermediate line of text as said justified line of text using first pitch "P(1)" for said first portion and second pitch "P(2)" for said second portion;

said counting means, recording means, comparing means, transferring means, calculating means and activating means being electrically connected in said microprocessor.

4. The apparatus as given in claim 3 wherein said microprocessor includes means for alternating said calculating means of said first pitch "P(1)" and second pitch "P(2)", respectively, for each subsequent justified line of text.

* * * * *